United States Patent
Oberle et al.

(10) Patent No.: US 7,866,225 B2
(45) Date of Patent: Jan. 11, 2011

(54) SPINDLE DRIVE, IN PARTICULAR FOR ADJUSTING A MOVABLE PART IN A MOTOR VEHICLE, AND A METHOD FOR MANUFACTURING THIS SPINDLE DRIVE

(75) Inventors: Hans-Juergen Oberle, Rastatt (DE); Andreas Lienig, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 201 days.

(21) Appl. No.: 11/994,554

(22) PCT Filed: Jan. 8, 2007

(86) PCT No.: PCT/EP2007/050134
§ 371 (c)(1), (2), (4) Date: Jan. 3, 2008

(87) PCT Pub. No.: WO2007/093458
PCT Pub. Date: Aug. 23, 2007

(65) Prior Publication Data
US 2008/0295624 A1 Dec. 4, 2008

(30) Foreign Application Priority Data
Feb. 14, 2006 (DE) .................. 10 2006 006 925

(51) Int. Cl.
*F16H 25/12* (2006.01)
*F16H 25/20* (2006.01)
*F16H 1/16* (2006.01)

(52) U.S. Cl. .................. 74/89.37; 74/89.36; 74/427
(58) Field of Classification Search ............ 297/362.12, 297/362.14; 74/425, 89.34, 424.75, 427, 74/89.14, 89.23, 89.37, 89.36
See application file for complete search history.

(56) References Cited

U.S. PATENT DOCUMENTS

| 2002/0073790 A1 | 6/2002 | Wiesler |
| 2004/0093969 A1* | 5/2004 | Nielsen .................. 74/89.23 |
| 2008/0011114 A1* | 1/2008 | Oberle et al. .......... 74/89.23 |

FOREIGN PATENT DOCUMENTS

| CN | 2651519 | 10/2004 |
| DE | 41 01 470 | 6/1992 |
| EP | 0 759 374 | 2/1997 |
| EP | 0 884 213 | 12/1998 |

* cited by examiner

*Primary Examiner*—Richard W Ridley
*Assistant Examiner*—Terence Boes
(74) *Attorney, Agent, or Firm*—Michael J. Striker

(57) ABSTRACT

A spindle drive (10), in particular for adjusting a movable part (58) in a motor vehicle, includes a drive assembly (42), which drives a drive wheel (18) supported on a spindle (16). The drive wheel (18) is rotatably supported in a support tube (14) that includes a receptacle (52) for a fastening device (54) for diverting crash forces. A guide tube (64) that accommodates the spindle (16) and overlaps axially with the support tube (14) is located coaxially with spindle (16).

16 Claims, 2 Drawing Sheets

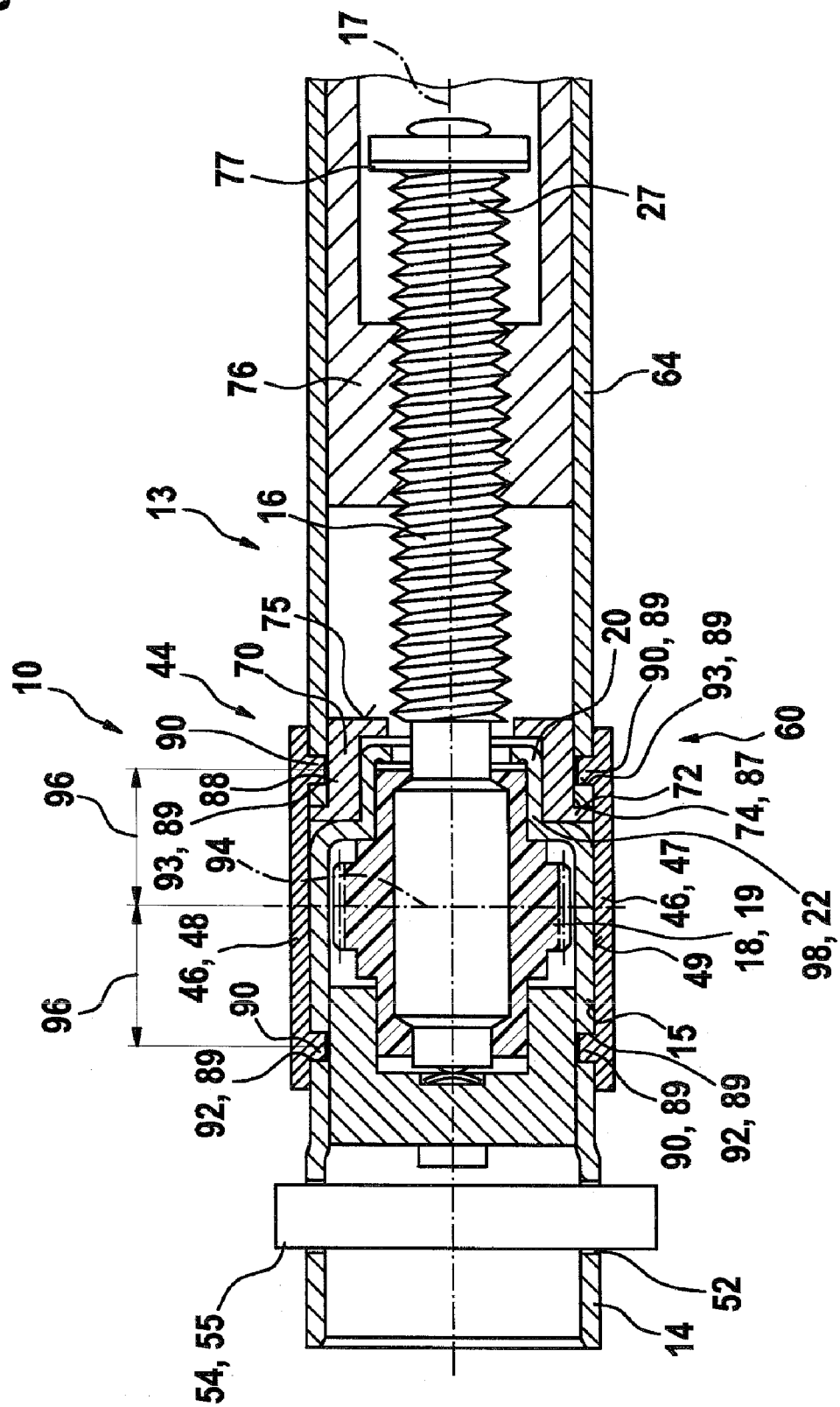

SPINDLE DRIVE, IN PARTICULAR FOR ADJUSTING A MOVABLE PART IN A MOTOR VEHICLE, AND A METHOD FOR MANUFACTURING THIS SPINDLE DRIVE

CROSS-REFERENCE

The invention described and claimed hereinbelow is also described in PCT/EP2007/050134, filed on Jan. 8, 2007 and DE 10 2006 006 925.0, filed Feb. 14, 2006. This German Patent Application, whose subject matter is incorporated here by reference, provides the basis for a claim of priority of invention under 35 U.S.C. 119 (a)-(d).

BACKGROUND OF THE INVENTION

The present invention relates to a spindle drive with a support tube, in particular for adjusting a movable part in a motor vehicle.

Publication EP 0 759 374 A2 makes known a device for adjusting a seat in a motor vehicle, which may absorb considerably greater forces than it does during normal operation. Forces such as these are generated, e.g., during a traffic accident. It is important that the vehicle seat remain fixedly connected with the body, to ensure that the protective measures (seat belt, air bag) provided for the vehicle occupants may perform their intended function. With the device described above, a counternut that accommodates a threaded spindle is fixedly connected with the body. The threaded spindle is driven via a worm gear pair by an electric motor, which is fixedly connected with the seat. The transmission housing of the worm gear pair is made of plastic and is connected with the drive motor via a further housing part. When the drive motor is actuated, the threaded spindle rotates and displaces the transmission housing, including the drive motor and seat, relative to the counternut. To prevent the transmission housing from tearing loose from the threaded spindle, e.g., when an accident occurs, an additional, metallic, U-shaped support part is provided, which connects the transmission housing via a hinged fastening bolt with the drive motor and, therefore, the seat. The disadvantage of this design is that the U-shaped support part is unable to prevent the spindle from buckling when it is compression loaded.

SUMMARY OF THE INVENTION

The inventive device and the inventive method have that advantage that, due to the nested configuration of the guide tube relative to the support tube, the flow of force that acts on the spindle may be introduced with practically no torque directly from the guide tube to the support tube and into the customer's fastening device. The spindle is therefore reliably prevented from buckling, thereby making it possible to absorb greater crash forces. In addition, the axially moved spindle nut may be guided reliably in the guide tube during normal adjustment operation.

Due to the measures listed in the dependent claims, advantageous refinements and improvements of the embodiments described in the independent claims are made possible. It is particularly advantageous to design the support tube and the guide tube with circular cross sections, since this makes it possible to insert the two tubes into each other in a form-fit manner. When the guide tube and the support tube are designed concentric with the spindle axis, the two tubes may be joined in each other very easily; this connection is particularly tolerance-insensitive to being displaced in the center.

A particularly strong resistance to crumpling is attained when the guide tube bears radially directly against the support tube in a certain overlap region. The crumpling resistance may be affected along the length of the overlap region.

In an alternative embodiment, an adapter element is inserted radially between the support tube and the guide tube. The adapter element, which is designed, e.g., as a peg-shaped ring, may be slid onto the support tube, and the guide tube may then be slid onto the peg-shaped adapter element. The diameter of the guide tube may thereby be adapted to the dimensions of a counternut located on the spindle.

Via the peg-shaped design of the adapter element or the end of the support tube, a jacket surface may be created to bear radially against the inside of the guide tube, while simultaneously forming an axial stop for the guide tube. Based on the material selected for the receiving peg, e.g., a press fit may be realized between the guide tube and the support tube.

The peg-shaped adapter element, or the end of the support tube, may be designed simultaneously as an axial stop for the spindle nut, thereby damping it gently.

When a rotatable counternut that is connected, e.g., with the part to be adjusted is located on the spindle, the counternut may be braced radially by the guide tube when it undergoes linear motion. Depending on the application, the outer jacket surface of the counternut may bear against the inner surface of the guide tube, or it may be located at a slight distance away therefrom.

It is particularly advantageous when the guide tube is reliably fastened on the support tube via the installation of the transmission housing. To this end, the transmission housing—which includes, e.g., a main body and a cover—may be installed radially in the manner of a collar around the two tubes, which have been inserted into each other.

It is particularly favorable when no additional, separate connection means are required to fasten the guide tube relative to the support tube. This may be attained, e.g., by forming recesses in the support tube and the guide tube, into which the radial projections of the transmission housing engage in a form-fit manner. Via the installation of the, e.g., two-pieced transmission housing, the guide tube is installed opposite to the support tube at the same time when the transmission housing parts are connected. The two tubes are therefore fastened in position relative to the transmission housing.

When the fastening means between the transmission housing and the support tube with the guide tube are designed symmetrical with the drive wheel located on the spindle, the spindle may extend out of the transmission housing in one or the other direction without changing the design of the individual components. As a result, the spindle motor, which is designed as a modular system, may be adapted for different installation positions without any additional effort.

The peg-shaped end of the support tube may be designed, e.g., as one piece with the support tube, or as a separate component that is inserted in the support tube or is attached in the support tube. The radial inner surface of the peg-shaped end serves to radially and axially support the drive wheel, and the outer jacket also serves to accommodate the guide tube and/or an adapter element. When the pot-shaped end plate is designed as one piece with the support tube, it may be advantageously designed very cost-favorably using a deep-drawing method in one working step.

With the inventive method for manufacturing the spindle drive, the support tube with the guide tube inserted thereon is a pre-fabricated module, onto which the transmission housing may then be installed. The installation process for the module with the guide tube requires an insubstantial amount of adaptation relative to the module without the guide tube.

Due to the symmetrical design of the fastening means on the spindle module relative to the transmission housing, the installation position of the spindle may be easily rotated by 180°. No design changes need to be made to the individual components. The fastening means between the transmission housing and the support tube-guide tube module may be easily varied and adapted. It is particularly favorable that the guide tube module is fixed in position relative to the transmission housing in one working step when the transmission housing is installed. The transmission housing may be joined, e.g., by screwing, clipping, welding, or pressing.

BRIEF DESCRIPTION OF THE DRAWINGS

Exemplary embodiments of the present invention are presented in the drawing and are described in greater detail in the description below.

FIG. 2 shows a further exemplary embodiment.

DETAILED DESCRIPTION OF THE PREFERRED EMBODIMENTS

Figure 1:
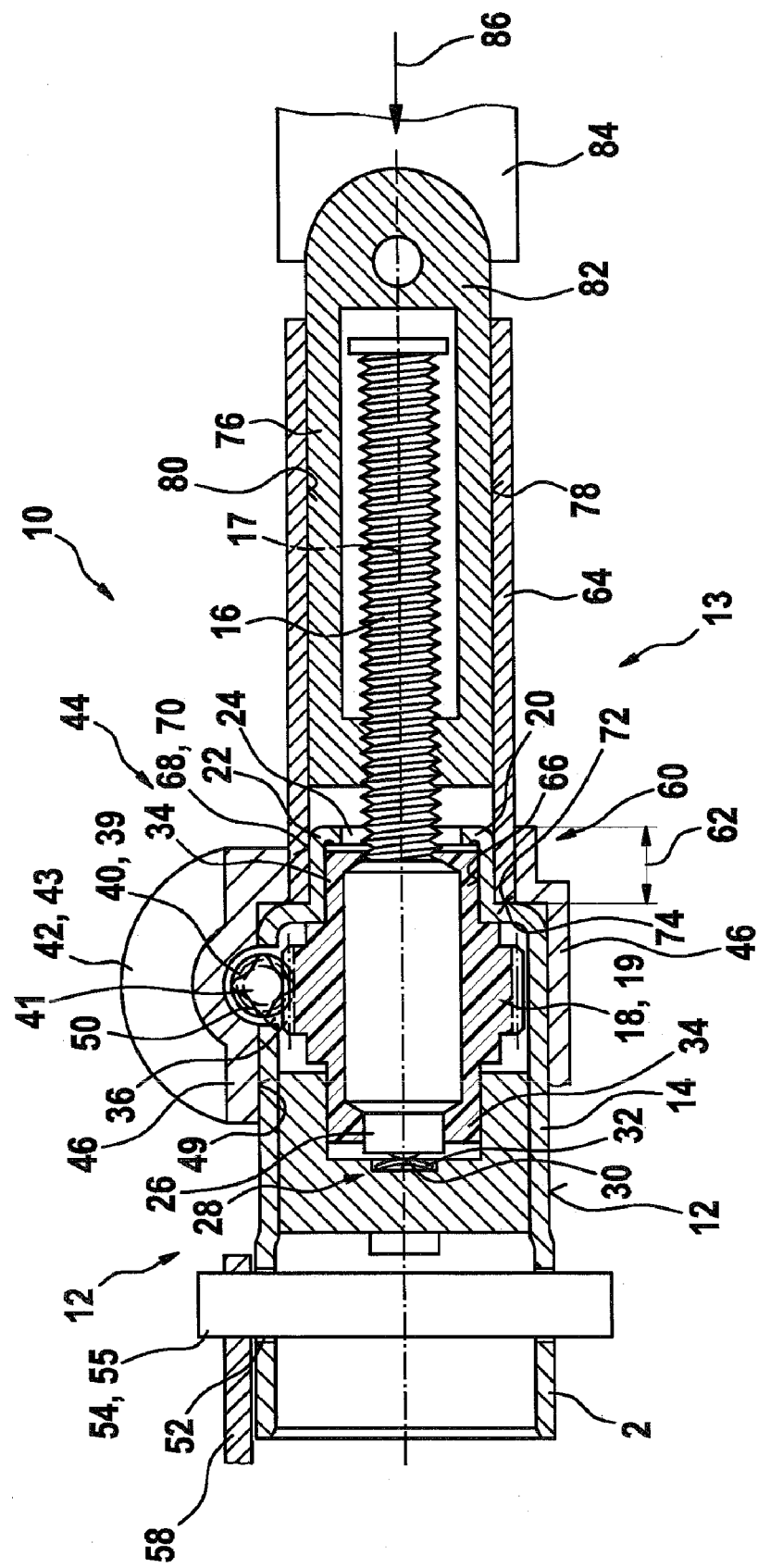
FIG. 1 shows a first exemplary embodiment of a spindle drive, in a cross section.

Spindle drive 10 shown in FIG. 1 is composed of a first assembly 12, with which a spindle 16 with a drive wheel 18 located thereon is supported in a support tube 14. Support tube 14 is manufactured, e.g., using deep drawing, and includes a pot-shaped bearing seat 22 for drive wheel 18 on an end region 20. Spindle 16 extends out of support tube 14, through an opening 24 in pot-shaped bearing seat 22. The other spindle end 26 is located inside support tube 14 and is supported axially and radially via an end shield 28 that is attached inside support tube 14. Spindle end 26 includes, e.g., a spherical stop surface 30, which rests axially against end shield 28. Optionally, a stiffer thrust washer 32 may be located in end shield 28. In this exemplary embodiment, drive wheel 18 is designed as worm wheel 19, which includes axial projections 34 for radial support. Drive wheel 18 is injection-molded using plastic directly onto spindle 16, or it is non-rotatably attached thereto, and includes toothing 36 that meshes with a driven element 40 of a drive assembly 42. Drive assembly 42 is designed as an electric motor 43 that includes a transmission housing 46, which is connected with first assembly 12 using a coupling device 44. An inner contour 49 of transmission housing 46 encloses an outer contour 15 of assembly 12. To transfer the drive torque from drive assembly 42 to separate assembly 12, support tube 14 includes a radial recess 50 into which driven element 40 engages. Driven element 40 is designed, e.g., as worm 39, which is located on an armature shaft 41 of electric motor 43. Support tube 14, as the standard component, practically forms a housing for separate assembly 12, on which various a receptacle 52 for a fastening device 54 is located. For example, a pivot bolt 55, as fastening device 54, may be slid into receptacle 52, in the center of support tube 14. With fastening device 54, support tube 14 is connected—e.g., in a hinged manner—with a part 58 to be adjusted in the motor vehicle, e.g., a not-shown seat or a seat part that is adjusted relative to another seat part.

Spindle 16, which extends out of support tube 14, is located in a guide tube 64, which is inserted on end 20 of support tube 14. Support tube 14 and guide tube 64 overlap in a overlap region 60, the length 62 of which may be specified depending on the requirements for crumple resistance. End 20 of support tube 14 is pot-shaped in design and forms, with its inner surface 66, bearing seat 22 for drive wheel 18 and, with its outer surface 68, a peg-shaped receiving element 70 for guide tube 64. Guide tube 64 and support tube 14, and/or receiving peg have a circular cross section, so that tubes 64 and 14 engage in each other while remaining centered relative to spindle axis 17. With this design, guide tube 64 bears directly and radially against outer surface 68 of support tube 14. Support element 64 includes an end face 72, which bears axially against a stop 74 of support tube 14. A counternut 76 is rotatably supported on spindle 16. Counternut 76 is displaced linearly along spindle axis 17 when spindle 16 is rotated. Counternut 76 includes an outer jacket surface 78, which may be supported against inner wall 80 of guide tube 64. On an end 82 facing away from support tube 14, counternut 76 extends out of guide tube 64 and is connected, e.g., with body 84.

If a compression force 86 acts on spindle 16 along spindle axis 17 as the result of an accident, spindle 16 is braced laterally against guide tube 64, which is connected with support tube 14 in a crumple-proof manner via receiving peg 70. If spindle 16 crumples to the side, torques that are produced are diverted to fastening device 54 via support tube 14. As a result, spindle end 16 and, therefore, part 58 to be adjusted, remain in their intended positions when a crash occurs.

FIG. 2 shows a further embodiment of a spindle drive 10, with which an adapter element 88 is located on support tube 14, on which guide tube 64 is located with an overlap region 60. Adapter element 88 is designed in the shape of a peg with a circular cross section and performs the function of end 20—designed as receiving peg 70—of support tube 14 in FIG. 1. Guide tube 64 bears radially directly against adapter element 88, which is located radially between guide tube 64 and end 20 of support tube 14. A collar 87 of adapter element 88 forms axial stop 74 for guide tube 64. Adapter element 88 includes an axial stop 75 opposite to collar 87, against which counternut 76 is damped upon impact. End 27 of spindle 16 that extends through guide tube 64 includes a stop for counternut 76. Guide tube 64, which has been inserted onto support tube 14, forms a single module 13, which is connected with drive assembly 42 after it has been joined on its outer contour 49. To this end, drive assembly 42 includes a transmission housing 46 with an inner contour 15, on which radial projections 90 are located, which engage in corresponding radial recesses 92 and 93 of support tube 14 and guide tube 64. Radial projections 90 form—together with recesses 92 and 93—fastening means 89 of coupling device 44 for module 13. In further embodiments, fastening means 89 may be formed by other form-fit connections. In FIG. 2, fastening means 89 are located symmetrically to a central plane 94 of drive wheel 18, thereby enabling module 13 to be installed such that it is rotated by 180°, without redesigning any of the individual components. For example, recesses 92 and 93 with corresponding radial projections 90 are formed with the same axial distance 96 from central plane 94. Transmission housing 46 includes a main body 47 and a cover 48, which are installed radially to module 13 and are interconnected. When the two transmission housing parts 47 and 48 are connected, support tube 14 and guide tube 64 of module 13 are simultaneously attached to transmission housing 46 via fastening means 89.

In a variation that is shown in the lower half of FIG. 2, pot-shaped end 20 of support tube 14 is designed as a separate component 98, which is joined as bearing seat 22 in cylindrical support tube 14. Component 98 performs the same function as receiving peg 70 of the embodiment that is designed as one piece with the support tube.

It should be noted that, with regard for the exemplary embodiments presented in the figures and the description, many different combinations of the individual features are possible. For example, support tube 14 may be manufactured using different methods, and it may have different specific designs. Instead of being designed as an integrally formed, pot-shaped bearing seat 22, support tube 14 may also be designed as a smooth cylindrical tube in which two separate end shields 28 for supporting spindle 16 are located. Spindle 16 is preferably supported via drive wheel 18 supported thereon, although, in one variation, it may also be supported via bearing surfaces that are integrally formed directly on spindle 16. The device used to transfer torque from drive assembly 42 is not limited to a worm gear pair 19, 39. Torque may also be transferred, e.g., using a spur gear. The specific shape and material used for receiving peg 70 are selected depending on the strength requirement. Receiving peg 70 may be designed as an adapter element 88 if necessary. Receiving peg 70 may also have a stepped or tapered design. The cross section of support tube 14 and guide tube 64 is not limited to a circle. The cross section may also be, e.g., rectangular or elliptical (for tolerance compensation). Given a cylindrical design of support tube 14, however, guide tube 64 may be reliably centered relative to spindle axis 17.

What is claimed is:

1. A spindle drive (10) for adjusting a movable part (58) in a motor vehicle, comprising:
    a drive assembly (42) for driving a drive wheel (18) supported on a spindle (16), the drive wheel (18) being rotatably supported in a support tube (14), wherein said support tube (14) includes a receptacle (52) for a fastening device (54) for diverting crash forces;
    a guide tube (64) that accommodates the spindle (16) and overlaps axially with the support tube (14), wherein said guide tube (64) is disposed coaxially with the spindle (16); and
    an adapter ring (88);
    wherein an end (20) of the support tube (14) or the adapter ring (88) includes an axial stop (75) for the spindle nut (76).

2. The spindle drive (10) as recited in claim 1, wherein the support tube (14) and the guide tube (64) are cylindrical in design, and the guide tube (64) is inserted on or in the support tube (14).

3. The spindle drive (10) as recited in claim 1, wherein an inner wall (80) of the guide tube (64) bears directly and radially against an outer wall (68) of the support tube (14).

4. The spindle drive (10) as recited in claim 1, wherein the end (20) of the support tube (14) or the adapter ring (88) is designed in the shape of a peg to accommodate the support tube (64), and wherein the end (20) of the support tube (14) or the adapter ring (88) includes an axial stop (74, 87) for the guide tube (64).

5. The spindle drive (10) as recited in claim 1, wherein a counternut (76) that is guided inside the guide tube (64) is rotatably located on the spindle (16).

6. The spindle drive (10) as recited in claim 1, wherein the drive assembly (42) includes a transmission housing (46), wherein the guide tube (64) is attached via said transmission housing (46) opposite to the support tube (14) without the use of separate connecting means.

7. The spindle drive (10) as recited in claim 1, wherein a transmission housing (46, 47, 48) is configured to be radially installable and includes radially inwardly oriented projections (90) as fastening means (89), wherein said projections (90) which engage in recesses (92) formed as fastening means (89) in the guide tube (64), and in recesses (93) in the support tube (14).

8. The spindle drive (10) as recited in claim 1, wherein the support tube (14) includes a pot-shaped axial end plate (22), wherein said pot-shaped axial end plate (22) is designed as one piece with the support tube (14), or is attached in the support tube (14) as a separately-designed component (98).

9. The spindle drive (10) as recited in claim 1, wherein the support tube (14) includes a pot-shaped axial end plate (22), wherein said pot-shaped axial end plate (22) is designed as one piece with the support tube (14) formed using a deep-drawing method in one working step.

10. The spindle drive (9) as recited in claim 9, wherein the spindle (16) extends out of the support tube (14) through an opening (24) in the pot-shaped axial end plate (22).

11. The spindle drive (10) as recited in claim 1, wherein the spindle drive (10) comprises a first assembly (12), wherein in said first assembly the spindle (16) with the drive wheel (18) located thereon is supported in the support tube (14), wherein the support tube (14) with the guide tube (64) inserted thereon is a pre-fabricated module, wherein a transmission housing (46) is installable onto said pre-fabricated module in a later assembly process,
    wherein the drive assembly (42) is formed as an electric motor (43) that includes the transmission housing (46), wherein said transmission housing (46) is connected with said first assembly (12) using a coupling device (44).

12. The spindle drive (10) as recited in claim 11, wherein to transfer a drive torque from the drive assembly (42) to the first assembly (12), the support tube (14) includes a radial recess (50) into which a driven element (40) engages.

13. A spindle drive (10) for adjusting a movable part (58) in a motor vehicle, comprising:
    a drive assembly (42) for driving a drive wheel (18) supported on a spindle (16), the drive wheel (18) being rotatably supported in a support tube (14), wherein said support tube (14) includes a receptacle (52) for a fastening device (54) for diverting crash forces;
    a guide tube (64) that accommodates the spindle (16) and overlaps axially with the support tube (14), wherein said guide tube (64) is disposed coaxially with the spindle (16); and
    an adapter ring (88) is located radially between the support tube (14) and the guide tube (64).

14. A spindle drive (10) for adjusting a movable part (58) in a motor vehicle, comprising:
    a drive assembly (42) for driving a drive wheel (18) supported on a spindle (16), the drive wheel (18) being rotatably supported in a support tube (14), wherein said support tube (14) includes a receptacle (52) for a fastening device (54) for diverting crash forces;
    a guide tube (64) that accommodates the spindle (16) and overlaps axially with the support tube (14), wherein said guide tube (64) is disposed coaxially with the spindle (16);
    wherein a transmission housing (46, 47, 48) is configured to be radially installable and includes radially inwardly oriented projections (90) as fastening means (89), wherein said projections (90) engage in recesses (92) formed as fastening means (89) in the guide tube (64), and in recesses (93) in the support tube (14); and
    wherein the fastening means (89) are located symmetrically to a central plane (94) of the drive wheel (18) wherein said central plane (94) extends transversely to the spindle (16).

15. A spindle drive (10) for adjusting a movable part (58) in a motor vehicle, comprising:
    a drive assembly (42) for driving a drive wheel (18) supported on a spindle (16), the drive wheel (18) being rotatably supported in a support tube (14), wherein said support tube (14) includes a receptacle (52) for a fastening device (54) for diverting crash forces;

a guide tube (64) that accommodates the spindle (16) and overlaps axially with the support tube (14), wherein said guide tube (64) is disposed coaxially with the spindle (16);

wherein a transmission housing (46, 47, 48) is configured to be radially installable and includes radially inwardly oriented projections (90) as fastening means (89), wherein said projections (90) engage in recesses (92) formed as fastening means (89) in the guide tube (64), and in recesses (93) in the support tube (14); and wherein outer contours (15) of the support tube (14) and the guide tube (64), and an inner contour (49) of the transmission housing (46, 47, 48) with the fastening means (89) are configured such that the spindle (16) is installable with the guide tube (64) in two 180° installation positions that are rotated by 180° relative to each other without having to change the design of the components used.

16. A method for manufacturing a spindle drive (10), comprising the following steps:

providing a spindle (16);

providing a drive wheel (18) supported on a spindle (16), the drive wheel (18) being rotatably supported in a support tube (14);

providing a guide tube (64) that accommodates the spindle (16) and overlaps axially with the support tube (14);

inserting the spindle (16), with the drive wheel (18), in the support tube (14);

axially inserting the guide tube (64) in or on the support tube (14), wherein a transmission housing (46, 47, 48) is located radially around the support tube (14) and the guide tube (64), thereby connecting the guide tube (64) with the support tube (14) in a centered manner, wherein the transmission housing (46) is always used for various installation positions of the spindle drive (10), into which the support tube (14) with the guide tube (64) and the spindle (16) may be selectively installed, such that the spindle (16) extends axially out of the transmission housing (46) on one side or the opposite side.

* * * * *